United States Patent
Bradley et al.

(10) Patent No.: US 6,935,667 B2
(45) Date of Patent: Aug. 30, 2005

(54) WHEELS FOR A WHEELED VEHICLE

(75) Inventors: Aidan J. Bradley, Newbury Park, CA (US); Kevin T. Parent, Santa Barbara, CA (US); Frank K. Weigand, La Canada, CA (US)

(73) Assignee: The Wheel Thing, Inc., La Canada, CA (US)

( * ) Notice: Subject to any disclaimer, the term of this patent is extended or adjusted under 35 U.S.C. 154(b) by 0 days.

(21) Appl. No.: 10/428,173

(22) Filed: Apr. 30, 2003

(65) Prior Publication Data

US 2003/0205909 A1 Nov. 6, 2003

Related U.S. Application Data

(60) Provisional application No. 60/377,896, filed on May 2, 2002.

(51) Int. Cl.$^7$ .............................. B60B 17/02; B60C 7/26
(52) U.S. Cl. ............................ 295/15; 295/21; 301/6.3; 301/64.304; 152/382
(58) Field of Search ....................... 301/64.101, 64.201, 301/64.202, 64.301, 64.302, 64.304, 64.305, 64.306, 6.3; 152/382, 393, 394; 295/1, 15, 21, 22

(56) References Cited

U.S. PATENT DOCUMENTS

| | | | | |
|---|---|---|---|---|
| 28,512 A | * | 5/1860 | Smith | 295/11 |
| 93,123 A | * | 7/1869 | Rogers | 295/21 |
| 417,995 A | * | 12/1889 | Dunstedter | 295/15 |
| 707,120 A | * | 8/1902 | Killian | 295/21 |
| 975,543 A | * | 11/1910 | Lichtenberg | 52/159 |
| 1,312,124 A | * | 8/1919 | Killen | 152/325 |
| 1,780,627 A | * | 11/1930 | Muller | 295/31.1 |
| 1,957,654 A | * | 5/1934 | La Brie | 188/264 R |
| 2,007,444 A | * | 7/1935 | Gannett | 301/64.305 |
| 2,028,135 A | * | 1/1936 | Budd | 295/30.1 |
| 2,187,777 A | * | 1/1940 | Gannett | 301/64.304 |
| 2,537,442 A | * | 1/1951 | Carriker | 152/153 |
| 2,927,822 A | * | 3/1960 | Rabe | 301/6.3 |
| 2,943,889 A | * | 7/1960 | Woldring et al. | 301/64.304 |
| 3,103,994 A | * | 9/1963 | Kelly | 188/264 R |
| 3,113,604 A | * | 12/1963 | Connor | 152/153 |
| 4,135,764 A | * | 1/1979 | Johnson et al. | 301/6.3 |
| 4,319,785 A | * | 3/1982 | Sato et al. | 301/6.3 |
| 4,696,520 A | * | 9/1987 | Henke et al. | 301/64.305 |
| 5,344,219 A | * | 9/1994 | Adrian et al. | 301/64.102 |
| 5,507,370 A | * | 4/1996 | White et al. | 188/264 G |
| 5,551,761 A | * | 9/1996 | White | 301/6.3 |
| 5,782,540 A | * | 7/1998 | Camfield et al. | 301/64.202 |
| 6,375,243 B1 | * | 4/2002 | Bradley et al. | 295/1 |

* cited by examiner

*Primary Examiner*—Russell D. Stormer
(74) *Attorney, Agent, or Firm*—Richard S. Erbe

(57) ABSTRACT

A wheel assembly for a wheeled vehicle utilizes interchangeable wheel hubs to secure various types of tires to provide better performance and maintenance on the vehicles. The design of the hubs is such that fabrication costs are reduced as well as costs for maintaining wheel inventories. The hubs are designed with locking elements and shoulders to ensure that tires are effectively secured in the wheel assembly. The hub is configured so that replacement of worn tires is done quickly, without having to touch the wheel bearings or drain the lubricant.

4 Claims, 6 Drawing Sheets

WHEELS FOR A WHEELED VEHICLE

RELATED APPLICATIONS

This application claims the filing date benefit of U.S. Provisional Patent Application No. 60/377,896, filed May 2, 2002, entitled Improved Wheels, and co-owned related U.S. Pat. No. 6,375,243, entitled Wheel Assembly For a Roller Coaster, the contents of which are incorporated herein, and co-owned related pending U.S. patent application Ser. No. 10/061,012, entitled Wheel Assembly For a Roller Coaster, filed Jan. 28, 2002, the contents of which are incorporated herein.

BACKGROUND OF THE INVENTION

1. Field of the Invention

This invention relates generally to transportation, and more particularly to the construction of wheels for wheeled vehicles.

2. General Background and State of the Art

Related co-owned U.S. Pat. No. 6,375,243 and U.S. patent application Ser. No. 10/061,012 disclose substantial design advances and enhancements (which will be referred to herein as the "Enhanced Design") over the current technology for roller coaster load wheels. FIGS. 1 and 2 of the present application illustrate the details of the Enhanced Design. These enhancements are made possible by a double-layer tire construction with separate inner member 220 and outer tire member 210, outer tire member 210 being made of a relatively hard and rigid material while inner tire member 220 is made of a relatively softer and more resilient material. The tire members are mounted on two hub members 230 and 240 which mechanically secure tire members 210 and 220 when hub members 230 and 240 are attached to each other with bolts 270. The Enhanced Design provides longer wear than prior art wheels because of the durability of outer tire member 210, without sacrificing the desired ride quality. Because tire members 210 and 220 are not bonded to hub members 230 and 240, and because the hub assembly is a "split-hub" construction rather than a single piece construction, repair and replacement of wheels can be made more quickly and easily with the Enhanced Design than wheels constructed in accordance with the current technology used in making wheels for rides. Hub members 230 and 240 also include openings 236 in them to allow for circulation of air for cooling of the wheels during operation, thus helping to alleviate problems associated with heat buildup, especially in tires used under extremely high loads.

The present invention builds upon the Enhanced Design wheel assemblies, while providing further benefits and advantages over the prior art as well as the Enhanced Design. For example, the Enhanced Design incorporates two distinctively different hub member configurations, thus meaning that for each wheel assembly, operators have to ensure that they stock quantities of both hub members. This feature also requires fabricators to have separate sets of tooling for the hub members in order to be able to produce the hub assemblies.

The Enhanced Design is configured for use with the dual layer tire design and can not be easily used for other wheel configurations that are used on wheeled vehicles.

In the Enhanced Design, the bolts connecting the two hub members must be inserted through the inboard hub member (the member closest to the ride vehicle body), thus adding some difficulty to the maintenance and changing of wheels.

In the Enhanced Design, one hub member (the inboard member) has to carry the bearings, while the other hub member does not, thus requiring that the hub members are of different construction.

In the Enhanced Design, the hub members are cast and designed for use in applications where heat removal is an issue and does not allow for using less expensive machined hubs that can be used in applications where heat removal is not an issue.

SUMMARY OF THE INVENTION

Accordingly, it is an object of the present invention to provide an improved wheel design for wheeled vehicles that is less expensive to fabricate than wheels used for similar applications.

Another object of the invention is to provide a wheel design that can be used for applications other than for just high speed or heavy load roller coaster applications.

It is yet another object of the invention to provide a wheel assembly that is comprised of interchangeable parts.

A further object of the invention is to provide a wheel design that allows vehicle owners and operators to carry smaller, less costly inventories of parts.

It is yet a further object of the invention to provide a wheel design that enables an operator to replace worn tires more quickly than with other designs.

Still another object of the invention is to provide a wheel design that enables changing of tires without having to replace the wheel bearings, seals, or drain the lubricant.

Another object of the present invention is to provide a wheel design that enhances bearing performance and extends the life of bearings and lubricant seals.

Still a further object of the invention is to provide a wheel design that lessens or eliminates bearing wear.

These and other objectives are achieved by the present invention, which, in a broad aspect, provides owners and operators of wheeled vehicles with a cost efficient, versatile, easily changeable wheel assembly for wheeled vehicles.

A wheel design according to a preferred embodiment of the present invention provides a hub assembly for use with a wheeled vehicle having two identical and interchangeable hub members, either of which can be used as the inboard or outboard member of the wheel assembly. A separate bearing cassette element is used in conjunction with the hub members. The hub members each have a flanged inner face, which, when the hubs are assembled with a tire, provides some radial preloading and centering force as well as mechanically locking the tire into place. The locking feature locks the tire in place laterally and prevents axial and circumferential creep.

The use of identical hub members means that fabrication costs of the wheels are reduced because less tooling is required to produce cast hubs and less machining is required to produce machined hubs.

Because the hub members are identical and interchangeable in the present invention, there is less chance for error in assembling wheels, and spare and replacement part inventories can be reduced because there are fewer parts.

In one embodiment of the present invention, the hub members further include openings that form air passageways. When the wheeled vehicle is in motion, the air passageways enable the hub assembly to perform as dual centrifugal fans to remove heat from the wheels. This feature, along with the locking feature discussed previously, provides a low resistance thermal path for the heat that is generated during operation because the tire material in the mechanical lock is open to the cooling air flow through the hub.

In another embodiment of the present invention, less expensive machined hub members are provided for applications where heat removal is not an issue. The machined hub members may also be used for guide wheels and upstop wheels as well as load wheels.

The wheel design of the present invention also allows the use of an oil management system to reduce oil churning losses thereby reducing rolling resistance and heat input to the bearings and lubricant, thus extending the life of both.

Further objects and advantages of the present invention will become more apparent from the following description of the preferred embodiments, which, taken in conjunction with the accompanying drawings, will illustrate, by way of example, the principles of the invention.

DETAILED DESCRIPTION OF THE PREFERRED EMBODIMENTS OF THE INVENTION

In the following description of the present invention, reference is made to the accompanying drawings, which form a part thereof, and in which are shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

Figure 1:
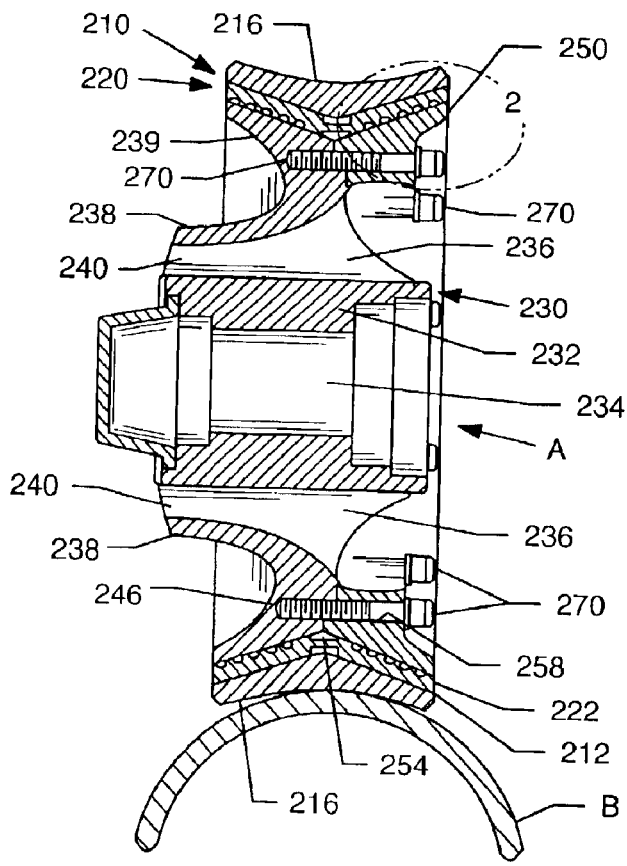
FIG. 1 is a cross-sectional view of the wheel assembly of the Enhanced Design, resting on a tubular rail.
Figure 2:
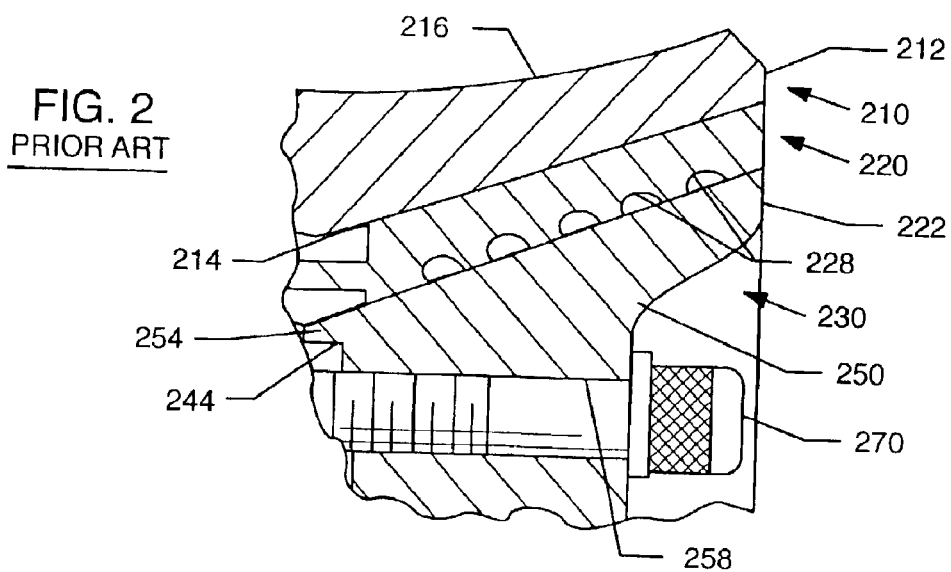
FIG. 2 is an enlarged cross-sectional view of an axial portion of the inner and outer tire members and their supporting hub, in accordance with the Enhanced Design, taken in circle 2—2 of FIG. 1.
Figure 3:
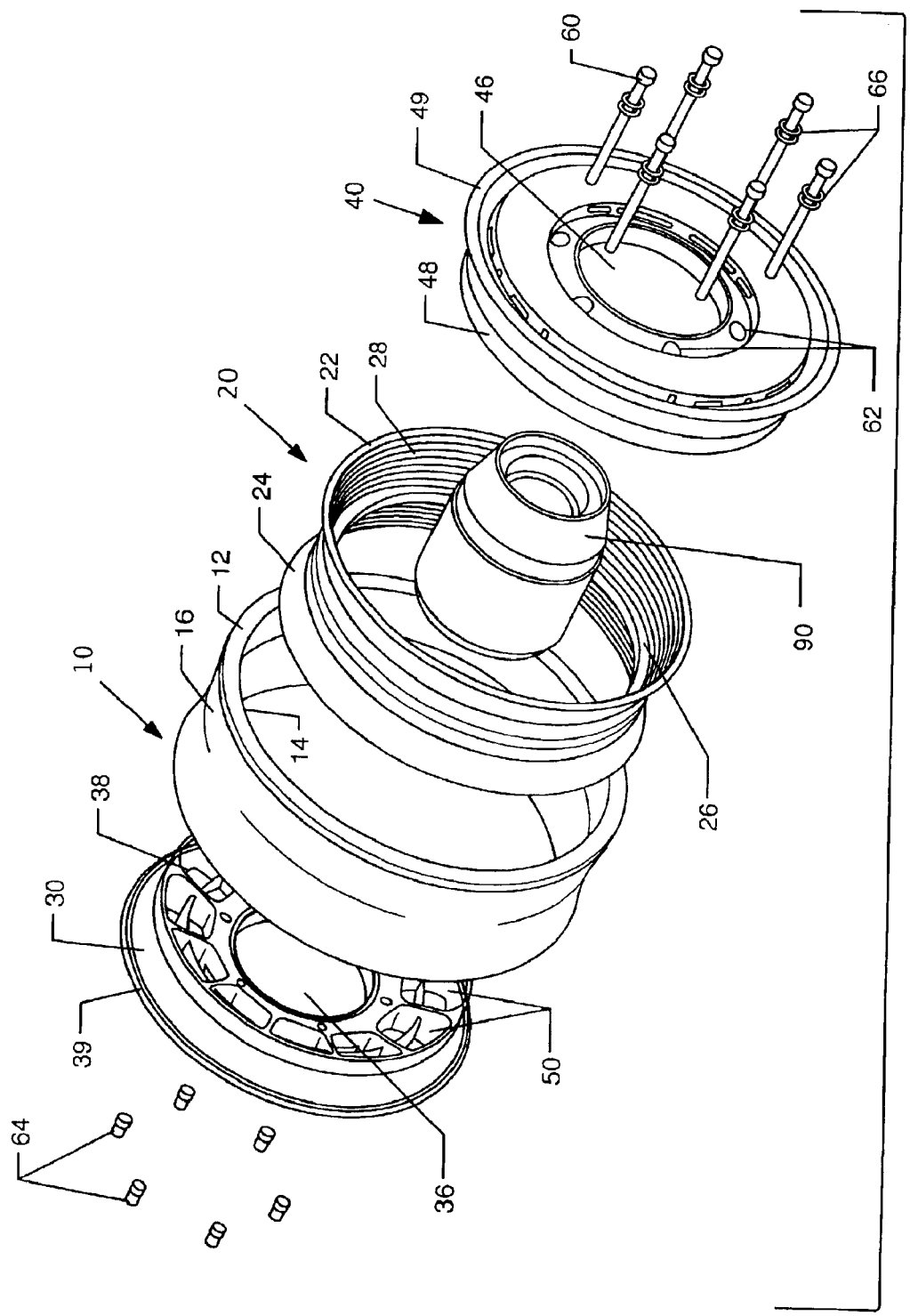
FIG. 3 illustrates an exploded perspective view of an exemplary wheel assembly according to the present invention.
Figure 4:
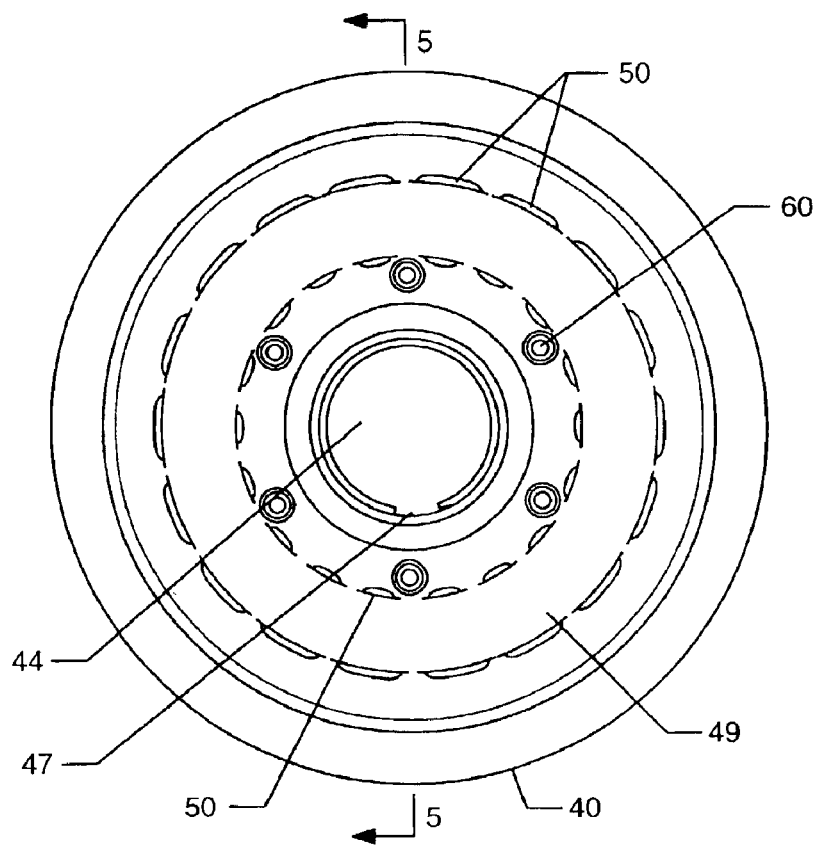
FIG. 4 illustrates an end view of an exemplary wheel assembly according to the present invention.
Figure 5:
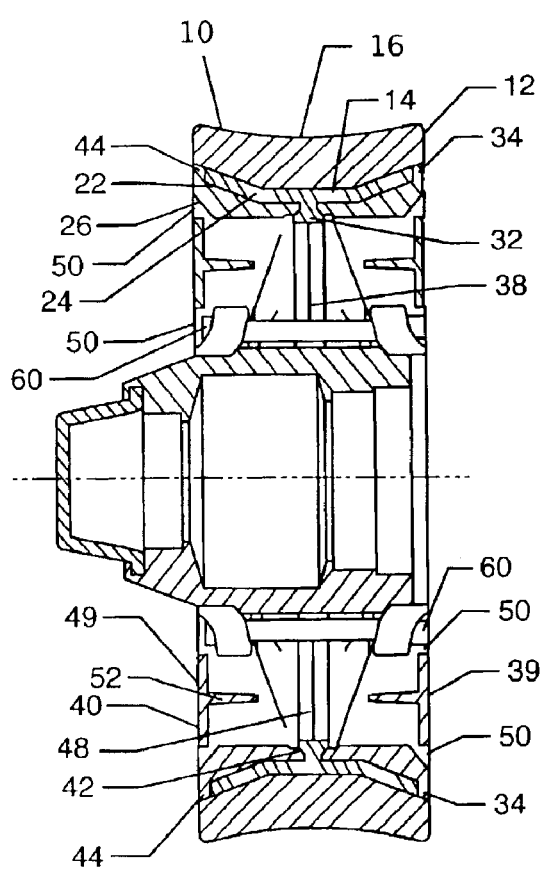
FIG. 5 illustrates a cross-sectional view of an exemplary wheel assembly according to the present invention, taken along line 5—5 of FIG. 4.

Referring now to the drawings, in particular FIGS. 3, 4, and 5, a new and improved wheel assembly according to the present invention is illustrated. FIG. 3 shows the inner tire member 20, outer tire member 10, inner hub member 30 and outer hub member 40. Previously incorporated U.S. Pat. No. 6,375,243 and FIGS. 1 and 2 of the present application detail the construction of inner tire member 20 and outer tire member 10, so it is not necessary to repeat that discussion here. Inner tire member 20, outer tire member 10, inner hub member 30 and outer hub member 40 are connected by bolts 60, which engage bolt holes 62 in outer hub member 40. Bolts 60 are inserted in bolt holes 62 and are further secured to the assembled wheel by washers 66 and threaded inserts 64 in bolt holes 62 of inner hub member 30. Washers 66 are Nordlock locking washers or equivalent for added security against loosening. Hub members 30 and 40 are identical in construction and are preferably made of cast aluminum. This configuration means that rather than having an inner hub member that carries the wheel bearings and an outer hub of different design, the hub in accordance with the present invention employs two identical hub members 30 and 40 and a separate bearing cassette element.

Hub members 30 and 40 are designed as dual centrifugal fans to remove heat from the wheel, especially in applications with heavy loads or high speeds. Air passageways 50 in hub members 30 and 40 provide the path for air to move through inner hub member 30 and outer hub member 40. Spoiler 52 increases turbulence and surface area leading to enhanced heat transfer to the atmosphere. Fin outer surfaces 54 have deliberately been left flat to accommodate the engagement of a noncontacting eddy current brake. The present invention provides enhanced thermal management over the Enhanced Design, because the design of the fans provides more surface area than does the Enhanced Design and is much more efficient.

FIG. 5 illustrates some of the features of hub members 30 and 40 that help secure tire members 10 and 20 in the wheel assembly. Inner hub member 30 has locking element 32 and outer hub member 40 has locking element 42 which, when the hub members are assembled, form a "T" which mechanically locks tire members 10 and 20 in place and prevents lateral creep. The "T" formed by locking elements 32 and 42 can also be used with other tire designs, as will be discussed later. Hub members 30 and 40 provide a controlled squeeze on the tire to positively locate the tire relative to the hub assembly. The tapered diameters of hub members 30 and 40 and the tire assembly are also designed to provide some preload and centering force to further register the tire. In addition, the inclusion of locking elements 32 and 42 provide a low resistance thermal path for the heat that is generated at the wheel rail contact point, since the tire material is open to the cooling air flowing through air passageways 50.

Inner tire member 20 is further secured between inner hub member 30 and outer hub member 40 by shoulder 34 on inner hub member 30 and shoulder 44 on outer hub member 40. Shoulders 34 and 44 adjoin flat peripheral surfaces 22 of inner tire member 20 as illustrated in FIG. 5 to further prevent lateral creep of inner tire member 20.

Figure 6:
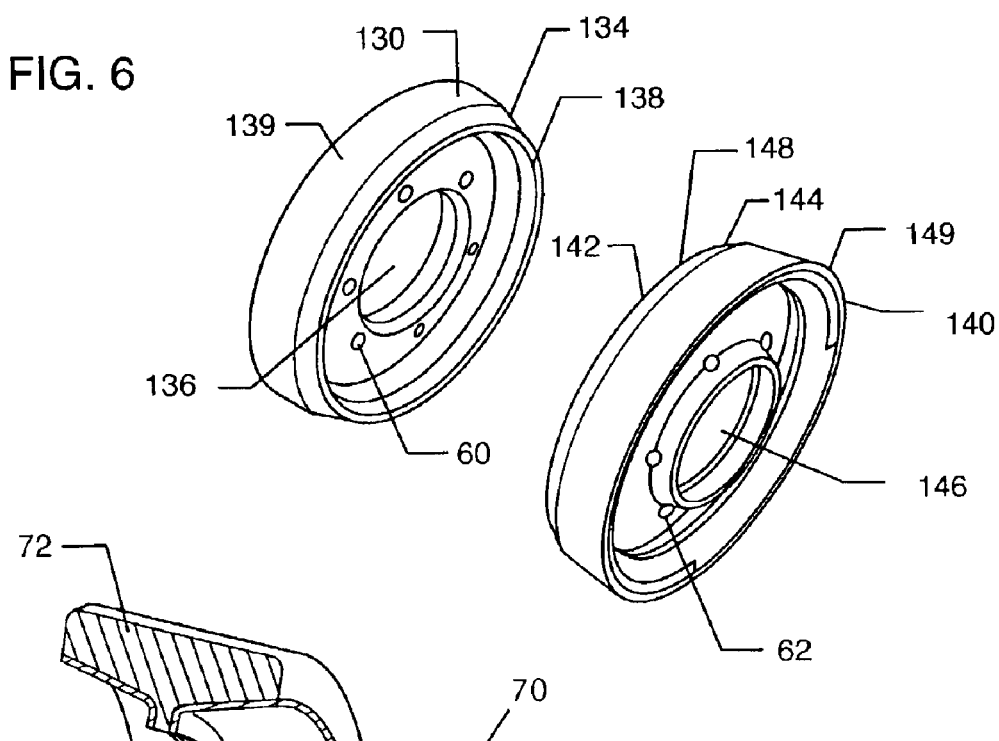
FIG. 6 illustrates a perspective view of the machined hubs according to a second embodiment of the present invention.

A wheel assembly in accordance with the present invention provides several additional options not available in present roller coaster wheels or the Enhanced Design. Amusement rides and other railed vehicles generally not only have load wheels that react to the vertical loads of the ride vehicle, but also employ side guide wheels that center the vehicle on the ride track and upstop wheels that prevent the vehicle from decoupling from the ride track in negative "g" maneuvers and in various failure modes. FIG. 6 illustrates a pair of machined hub members 130 and 140 in accordance with the present invention, except that, unlike hub members 30 and 40, machined hub members 130 and 140 do not have air passageways 50 to allow for the transfer of cooling air, because in many ride applications, thermal management is not an issue. Otherwise, machined hubs 130 and 140 are identical to hub members 30 and 40. Because machined hub members 130 and 140 are identical to each other, and therefore interchangeable, fabrication of the parts tends to be less expensive, and inventory requirements for the owner/operator are reduced.

Figure 7:
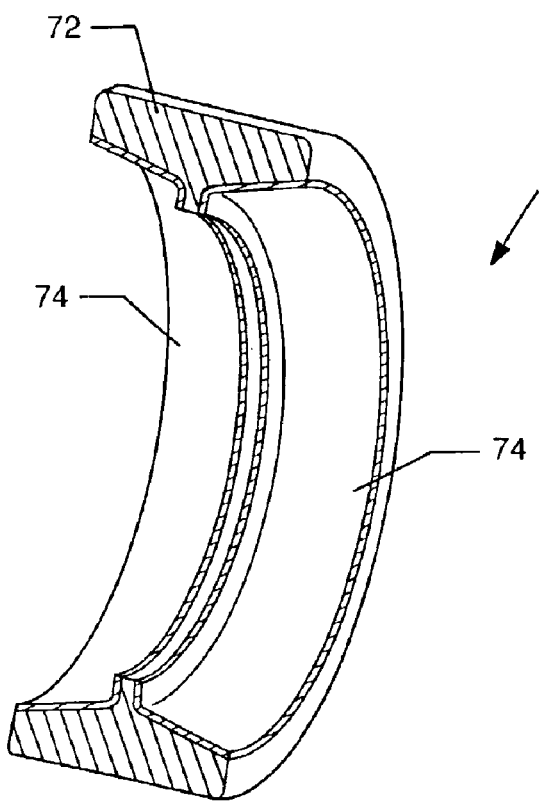
FIG. 7 illustrates a perspective sectional view of a tire and armature assembly according to a third embodiment according to the present invention.
Figure 8:
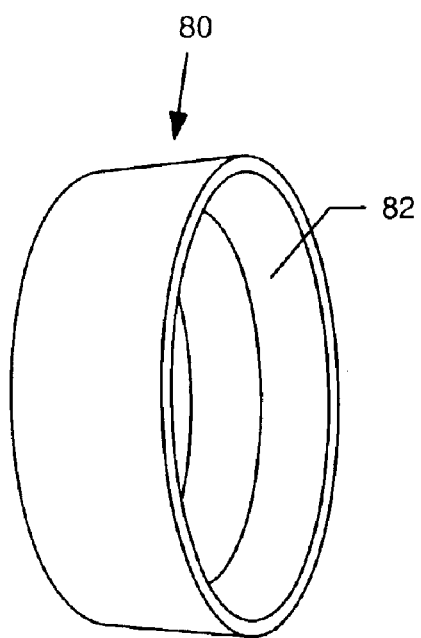
FIG. 8 illustrates a perspective view of a monolithic tire according to a fourth embodiment according to the present invention.

Alternative embodiments of the present invention are illustrated in FIGS. 7 and 8. FIG. 7 illustrates a duplex tire assembly 70 that when assembled with machined hub members 130 and 140, can be used for load wheels on existing applications or on less demanding new applications where conventional polyurethane tire performance has proven to be adequate. Duplex tire assembly 70 is constructed with a urethane tire 72 bonded to a pair of substantially conical thin aluminum rims or armatures 74. This bonded assembly becomes a disposable part. Using duplex tire assembly 70, the owner/operator can use the urethane formulation that has proven satisfactory for the application, and still get the thermal, maintenance, and life-cycle advantages of a wheel assembly in accordance with the present invention.

FIG. 8 illustrates another embodiment according to the present invention that when assembled with machined hub members 130 and 140 provides a monolithic wheel 80 that can be utilized for a number of ride applications. A monolithic wheel 80 uses a single tire 82, which can be a shaped cast urethane tire or a fabricated or cast plastic tire. Monolithic wheel assembly 80, when utilizing a tire 82 made from plastic can be used for lightly-loaded, constant contact applications where skidding does not occur and cushioning of the load is not necessary. A monolithic wheel assembly 80, when utilizing a tire 82 made from urethane can be used for side guide wheels, which are generally smaller in diameter than load wheels, which experience intermittent hard contact where they must be quickly spun up to speed. This embodiment of the present invention offers the owner/operator all of the advantages described herein.

The present invention has been optimized for easy replacement of worn tires. When a conventional wheel (a polyurethane tire bonded to the hub) wears out or fails, a lengthy process involving hundreds of individual steps must be used to recover the wheel. The owner/operator must drain the lubricant out of the wheel bearings, remove the wheel from the vehicle, press the bearings out of the hubs, clean and pack the wheel and ship it to the tire company. In many cases, over half of the wheels must be scrapped during the removal process because the bores in the aluminum hub are irreparably damaged when the bearing races are pressed out. Because the used bearings must be kept as a matched set, they are generally scrapped rather than risk mixing them up during reassembly. Once a wheel reaches the tire company, the worn tire is removed from the hub and a new tire is cast onto it. This process is complex and error-prone. The temperature control of the oven during the casting and bonding process is crucial, because the hub will lose its strength if it is overheated even slightly. Once the new tire is cast on the hub, it is returned to the owner. There it must then sit on the shelf for another six to eight weeks while the urethane completes its cure cycle. After that time, the bearings and seals are installed and the wheel is mounted on the ride vehicle.

Utilizing a wheel assembly in accordance with the present invention, the tires are separate, disposable, prefabricated parts. When a tire has worn out and needs to be replaced, the owner/operator removes bolts 62, removes outer hub member 40, removes the tire and discards it, installs a new tire, replaces outer hub member 40, and reinstalls bolts 62. The bearings and lubrication system are never touched. The hub assembly is out of service for a few minutes, rather than for three or four months.

Figure 9:
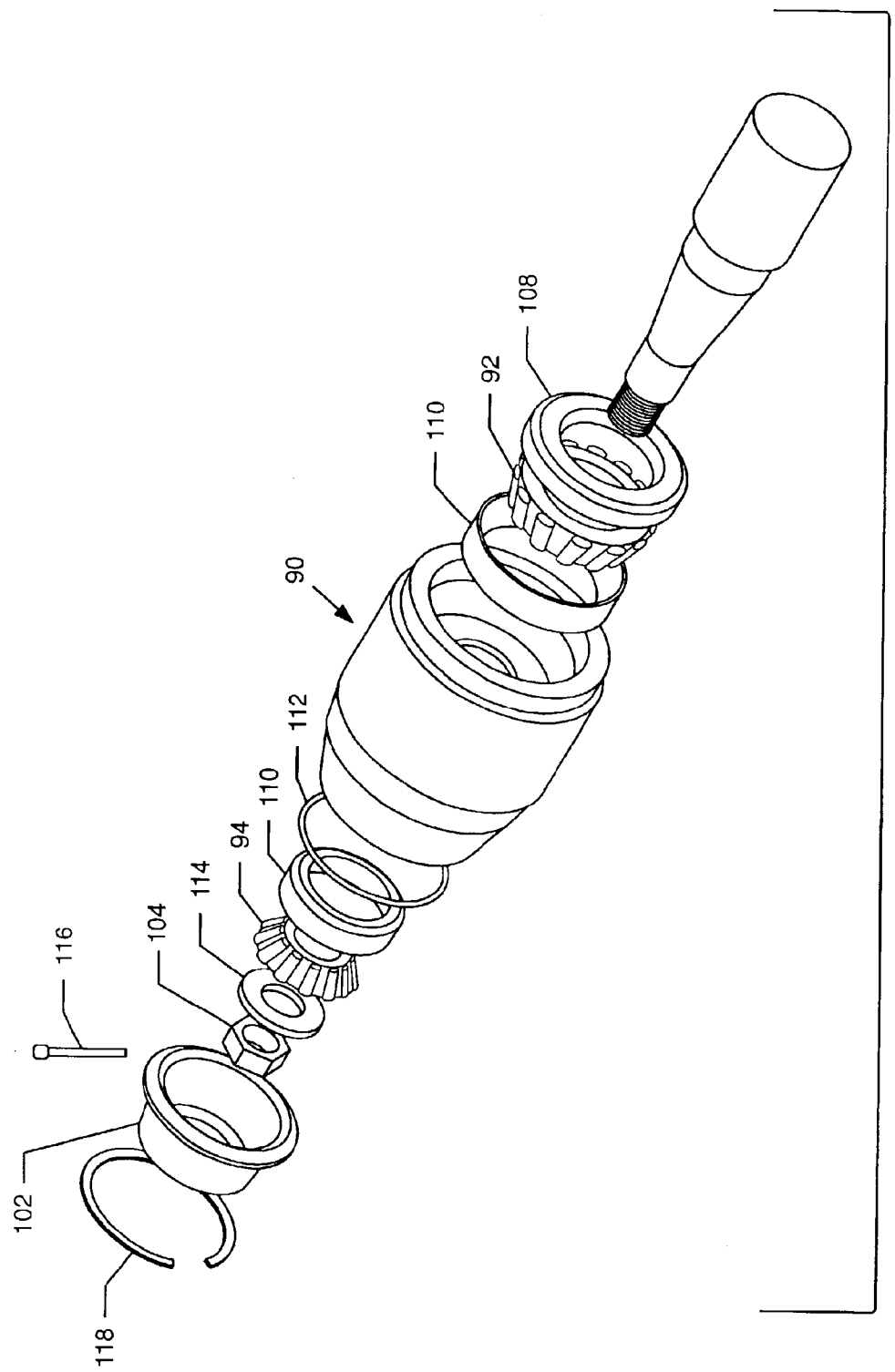
FIG. 9 illustrates an exploded perspective view of a hub cassette featuring an oil management system for use with an exemplary wheel assembly of the present invention.
Figure 10:
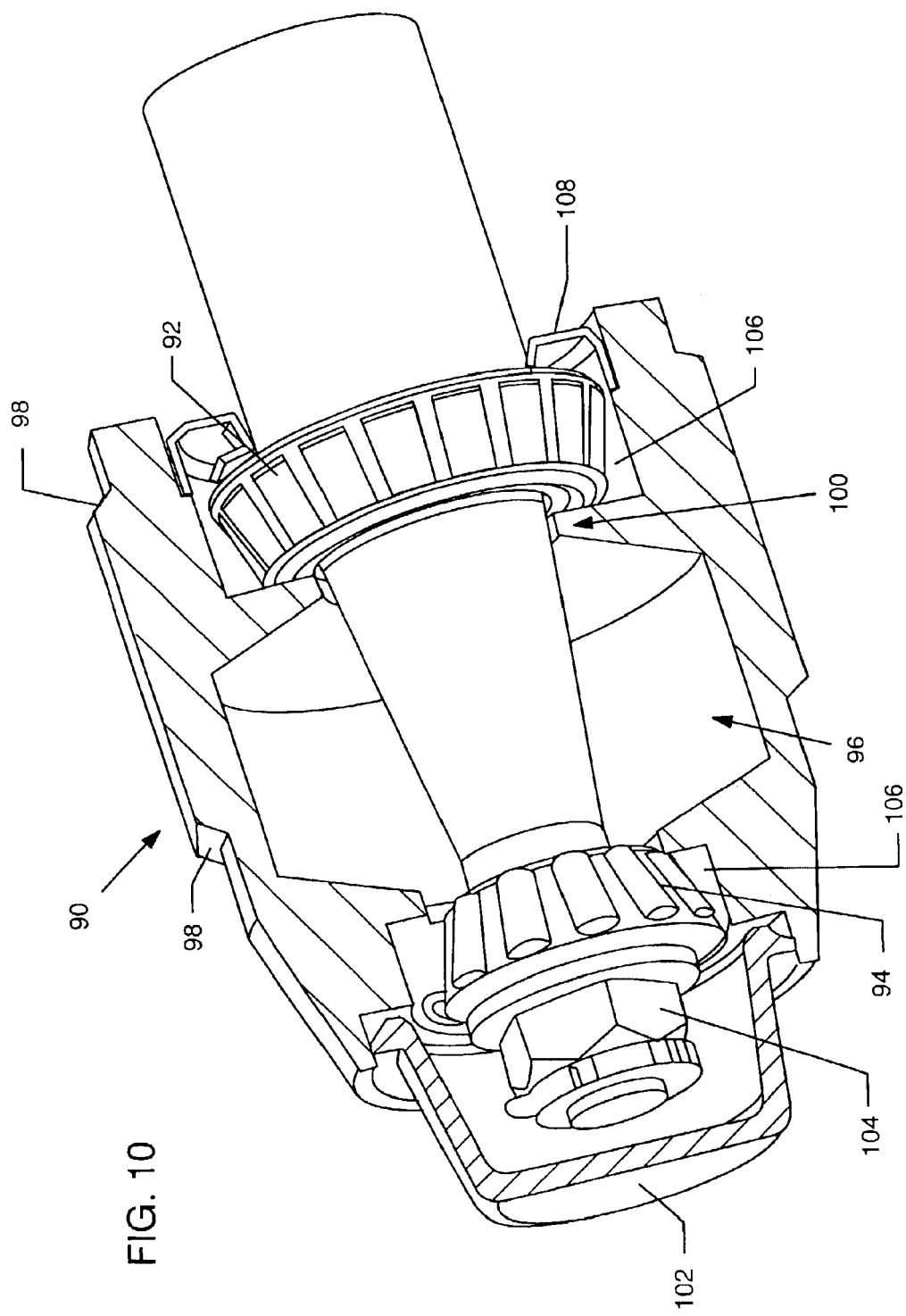
FIG. 10 illustrates a partial sectional side view of a hub cassette featuring an oil management system for use with an exemplary wheel assembly of the present invention.

A wheel assembly according to the present invention further includes oil management system 90, as illustrated in FIGS. 9 and 10. In the preferred embodiment of the present invention, oil management system 90 and the assembled wheel are joined together by securing interface 37 on inner hub member 30 and interface 47 on outer hub member 40 to wheel interface flanges 98 on oil management system 90. The configuration of oil management system 90 is optimized for use on wheel applications that have an essentially vertical disposition when the ride vehicle is parked. This configuration is designed to reduce oil churning and oil back pressure, thereby reducing heat input to inboard bearing 92, outboard bearing 94, and seals 108, extending their service lives. The geometry of oil management system 90 allows bearings 92 and 94 to be adequately lubricated with oil at low speeds (such as when a roller coaster is in the load/unload station). Minor modifications to the shape and orientation of the oil cache 96 and lips 100 can be made for wheels having other than a vertical disposition in the stopped position. As the wheel accelerates during the ride to higher speeds, the centrifugal action forces most of the lubricating oil to migrate to reservoir 96. A small amount of lubricant will remain at bearings 92 and 94 during operation to provide continuing lubrication, but not so much that the lubricant will churn and excessively heat up.

During operation, with the hub spinning, lubricating oil is thrown outwards. Because of the action of oil control lips 100, the bulk of the lubricating oil is retained in reservoir 96. Thus, the oil is inaccessible to the outward pumping action of bearings 92 and 94; however, sufficient oil is retained at the bearings for the duration of the ride. The advantages of this configuration include reduced churning of oil at the bearings, resulting in lower heat production and oil aeration. "Pump-out" is eliminated, resulting in reduced pressures in end cap 102 and behind oil seal 108, which reduces friction and wear of seal 108, increasing its life and reducing leakage. Also, the effective rolling resistance of a ride wheel incorporating oil management system 90 is significantly reduced, especially at high speeds.

The foregoing descriptions of the exemplary embodiments of the present invention have been presented for purposes of enablement, illustration, and description. It is not intended to be exhaustive of or to limit the present invention to the precise forms discussed. There are, however, other configurations for wheel assemblies not specifically described herein, but with which the present invention is applicable. The present invention should therefore not be seen as limited to the particular embodiments described herein; rather, it should be understood that the present invention has wide applicability with respect to wheel assemblies. Such other configurations can be achieved by those skilled in the art in view of the description herein. Accordingly, the scope of the invention is defined by the following claims.

What is claimed is:

1. A hub assembly for a vehicle wheel comprising:
   a first hub member having a central opening, an inner circumferential surface and an outer circumferential surface;
   a second hub member having a central opening, an inner circumferential surface and an outer circumferential surface, wherein said first hub member and said second hub member are identical;
   a plurality of matching bolt holes in said hub members for securing them together;
   the outer circumferential surfaces of the hub members forming a concave circumferential surface for receiving a tire thereon; and a plurality of locking elements on said inner circumferential surfaces of the hub members for mechanically locking a tire to the hub assembly when the hub members are assembled, the locking elements providing a low resistance thermal path for heat generated by the motion of the tire on a surface.

2. A wheel assembly for a wheeled vehicle comprising:

a generally ring-shaped integrally formed tire having a circumferential inner surface that is convexly shaped in a lateral direction;

at least two generally ring-shaped metallic rims each having an outer circumference and a smaller inner circumference and bonded to said tire and forming an inner circumferential surface;

a hub assembly having an outer circumferential surface; said inner circumferential surface of the metallic rims supported upon the hub assembly in engaging relationship with the outer circumferential surface of the hub assembly; and the hub assembly having locking elements for maintaining a radially outward force upon the inner circumferential surface of the tire and preventing the tire from moving laterally or circumferentially relative to the hub assembly, the locking elements providing a low resistance thermal path for heat generated by the motion of the tire on a surface.

3. The wheel assembly according to claim 2, wherein said metallic rims are constructed of aluminum.

4. The wheel assembly according to claim 2, wherein said tire is made from polyurethane.

* * * * *